Feb. 14, 1950     J. L. BOWMAN     2,497,717
SIDE DELIVERY RAKE Filed March 4, 1948     6 Sheets-Sheet 1

FIG. 1

INVENTOR.
JAMES L. BOWMAN
BY

ATTORNEY

FIG. 4

*INVENTOR.*
JAMES L. BOWMAN
BY

ATTORNEY

Feb. 14, 1950 J. L. BOWMAN 2,497,717
SIDE DELIVERY RAKE
Filed March 4, 1948 6 Sheets-Sheet 4

INVENTOR.
JAMES L. BOWMAN
BY

ATTORNEY

Patented Feb. 14, 1950

2,497,717

UNITED STATES PATENT OFFICE 2,497,717

SIDE DELIVERY RAKE

James L. Bowman, Eau Claire, Mich.

Application March 4, 1948, Serial No. 12,995

7 Claims. (Cl. 56—377)

This invention relates in general to a side delivery, agricultural rake and more specifically to a type of wheel supported frame from which a rake basket and the rake reel within said basket may be suspended.

The wheeled supporting frames of those side delivery rakes presently known represent little more than an improvisation over early side delivery rake frames of a type particularly designed to be horse drawn. The weight of such rakes was almost entirely supported upon wheels secured to the rake frame, and such wheels were so arranged that said rake would stand erect in operating position whether or not the horses were hitched thereto.

With the advent of the tractor, which is capable of supporting considerable weight, no successful attempt has hitherto been made to redesign the side delivery rake in order to take full advantage of the opportunities afforded by the use of a tractor in place of draft animals.

For example, most rakes being manufactured today drive the rake reel at its leading end where the load on said reel is the lightest. Thus, a considerable torque is imposed upon the reel, especially when a heavy or moist crop is being raked.

Furthermore, where the rake is driven by a driving wheel at the leading end of said basket, any turns made by said rake which tend to pivot the rake on the driving wheel will cause the rake reel to stand still, thereby leaving an unraked spot in the swath of the reel.

Many rakes employ the use of numerous, extra wheels to support the heavy frames necessary to prevent sagging of the basket where the rake has been converted for tractor operation from an old style horse driven rake. In such cases, the extra wheels usually make the rake awkward and difficult to turn. If a crop like beans or peanuts is being raked, much damage can be done by extra wheels, especially if said wheels are ahead of the rake. Thus, wheels which precede the basket tend to reduce the efficiency of the rake by trampling the crop closer to the ground.

Some attempts have been made to reduce the number of wheels used to support the basket by placing a wheel at both ends of the basket. In such a case and, in fact, in any case where the centerlines of the wheels supporting the basket are far apart, irregularities in the contour of the ground may sometimes cause the teeth depending from the rake reel to clear the ground entirely, or at other times will cause the basket to drag on the ground. Widespread wheels also introduce other problems, such as excessive yawing, which yawing arises from the drag imposed upon the frame by the driving wheel. The further the driving wheel is placed laterally from the line of pull upon the rake, the greater the yaw is and the more difficult it is to operate the rake.

The rake reel is sometimes driven from the central portion of a shaft which is in turn driven by a pair of wheels, one on either side of the rake. For this, a complicated ratchet mechanism must be incorporated into the drive of such a rake to compensate for the difference in rotational speeds of the two said wheels during any turns.

It thus becomes apparent that those side delivery rakes presently in use have one or more objectionable features which, due particularly to the design of their supporting frames, are mechanically, and/or economically, insurmountable without redesign of the said supporting frames.

Accordingly, it is a primary object of this invention to provide an improved wheeled supporting frame for a side delivery, agricultural rake.

A further object of this invention is to provide a wheeled rake supporting frame, as aforesaid, wherein at least the principal wheels trail the rake reel.

A further object of this invention is to provide a wheeled rake supporting frame, as aforesaid, whose wheels are so positioned that they cause no appreciable damage to the crop being raked.

A further object of this invention is to provide a wheeled rake supporting frame, as aforesaid, which is designed so that the rake reel supported thereon is driven at its trailing end, which is where the maximum torque load is imposed upon said reel.

A further object of this invention is to provide a wheeled rake supporting frame which, although extremely light in weight and having a minimum of supporting elements, positively prevents the reel basket supported thereon from sagging intermediate its extremities or whipping while being drawn over uneven ground.

A further object of this invention is to provide a wheeled rake supporting frame, as aforesaid, whose wheels are close enough to each other to keep the rake reel at a substantially constant distance from the ground being raked, even when said ground is somewhat uneven.

A further object of this invention is to provide a wheeled rake supporting frame, as aforesaid, whereby the rake real supported thereon is driven by a single driving wheel, which driving wheel is substantially in line with the line of pull upon the rake.

A further object of this invention is to provide a wheeled rake supporting frame, as aforesaid, whose driving wheel, located behind the swath of the rake reel, supports the greater part of that portion of the rake's weight carried by the wheels.

A further object of this invention is to provide a wheeled rake supporting frame, as aforesaid, whose driving wheel is so positioned that no appreciable amount of yaw is imposed thereby upon the rake while the rake reel is being rotated.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a wheeled supporting frame for a side delivery rake, which frame is comprised of three structural support beams disposed in a triangular arrangement. One corner of the triangle formed by said beams is supported upon a pivot wheel. Another corner of said triangle is supported upon the traction device, such as the rear end of an ordinary farm tractor, which draws the rake. A third corner of said triangle, which supports the trailing end of the rake reel and rake basket, is supported upon the driving wheel of the rake. The leading end of the rake reel and rake basket is supported upon that support beam opposite said third corner.

The rake reel and rake basket are suspended horizontally from said support frame at an angle of approximately 45 degrees to the axis of said driving wheel, which axis is horizontal and which wheel is fixed with respect to said supporting frame. Therefore, said reel and basket are also disposed at about a 45 degree angle to the direction of the normal forward movement of said rake. The driving wheel is operatively connected to the rake reel by means of a chain drive.

For one preferred embodiment of the invention, attention is directed to the accompanying drawings in which.

Construction

In order to facilitate a full disclosure of the wheeled rake supporting frame 10, illustrated in Figures 1, 2, 3 and 4, a considerable portion of the following description is devoted to the structure of a preferred type of side delivery rake 11 equipped with the said rake supporting frame 10. It will be understood, of course, that this illustrative reference to a preferred rake structure is not intended to impose any limitations upon the scope of the invention.

The support frame 10 is comprised of a longitudinal support beam 12, a lateral support beam 13 and a connecting support beam 14. These beams may be fabricated from any appropriate structural shapes, such as tubes or channels, provided only that they are strong enough to support the loads to which they are subjected. In this embodiment of the invention, tubular beams are used.

Figure 1:
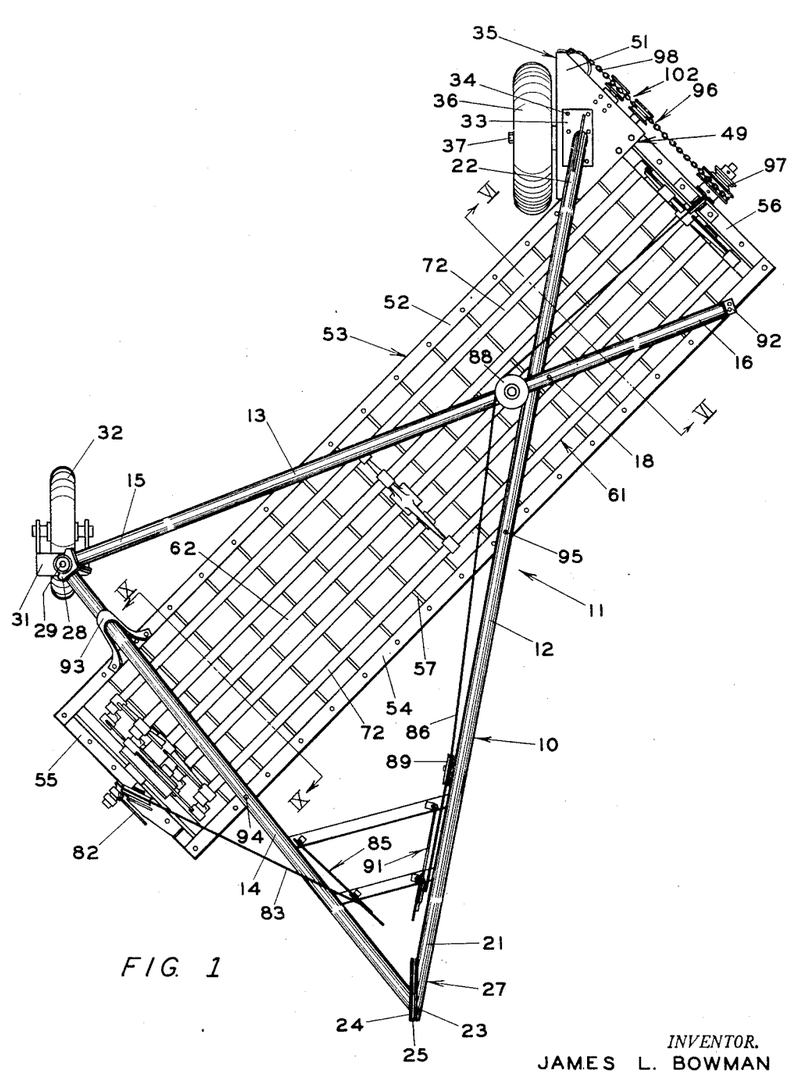
Figure 1 is a top plan view of a side delivery rake provided with the wheeled supported frame to which this invention relates.

The lateral beam 13, which has a leftward end 15 and rightward end 16, as seen from the pulling tractor and as appearing in Figure 1, crosses over and rests upon the longitudinal beam 12. A gripping bar 17 (Figure 4), which is secured to the underside of the lateral beam 13 by means of the bolts 18 at the point of intersection with the longitudinal beam 12, engages said longitudinal beam and tends to prevent relative movement between the longitudinal and lateral beams.

For the purpose of simplifying the description hereinafter, the side delivery rake 11, rake supporting frame 10 and associated parts thereof may be referred to as having a "leftward" or "leftwardly" side, a "rightward" or "rightwardly" side, a "rearward" or "trailing" end, and a "leading" or "front" end, as appearing in Figure 1.

The leading end 21 of the longitudinal beam 12 and the leftward end 15 of the lateral beam 13 are secured to the opposite extremities of the connecting beam 14, as hereinafter described in detail. The beams are arranged so that they form a triangular frame. However, the rightward end 16 of the lateral beam 13 and the trailing end 22 of the longitudinal beam 12 extend beyond the point of mutual intersection of the respective beams.

The longitudinal beam leading end 21 and the adjacent end of the connecting beam 14 are secured to separate anchor plates 23 and 24 in any convenient manner, such as by welding. The plates 23 and 24 are secured to opposite sides of the vertical hitch bar 25 by any suitable means, such as the bolts 26, to form the hitching corner 27 of the triangularly shaped rake supporting frame 10. The hitch bar 25 has a plurality of suitable hitching openings 30 by means of which the supporting frame 10 may be adjustably hitched to the rear end of any suitable traction device, such as the common farm tractor, not shown.

The lateral beam leftward end 15 and the adjacent end of the connecting beam 14 are both secured to a bearing bracket 28 in any suitable manner, such as by welding, to form the pivot wheel corner of the triangularly shaped rake supporting frame 10. The bearing bracket 28 (Figures 1 and 3) rotatably engages the vertical pivot shaft 29 of a pivot wheel yoke 31, which yoke rotatably supports the pivot wheel 32. Said pivot wheel 32 and the bearing within the bearing bracket 28 may be of any appropriate, conventional type.

The trailing end 22 of the longitudinal beam 12 is secured, as by welding, to an anchor plate 33, which plate is in turn attached, as by means of the bolts 34 (Figure 4), to the drive wheel support bracket 35. A drive wheel 36 (Figure 5) has a drive wheel shaft 37 which is rotatably supported within the drive shaft bearing housing 38. Said bearing housing is secured, as by welding, to the vertical flange 39 (Figures 3 and 4) of said wheel support bracket 35.

One end of the drive wheel shaft 37 is secured to the wheel 36, which wheel may be of any convenient type, while the other end 41 of said shaft 37 extends beyond the drive shaft housing 38. A conventional chain drive pulley 42 is rotatably supported upon that portion of said drive shaft 37 which is adjacent to the inside surface 43 of the vertical flange 39. The pulley 42 is provided with teeth 44 which are engaged by corresponding teeth 45 on a clutch 46, which clutch is slidably held upon the extended end 41 of the drive shaft 37.

A clutch spring 47, which is sleeved upon the extended drive shaft end 41, is held in compression between the clutch 46 and a lock collar 48 secured to the extremity of said extended end 41. The clutch spring 47 normally urges said clutch 46 into engagement with the drive pulley 42. The drive shaft extended end 41 is provided with a non-circular cross-section, such as being square, so that the clutch 46 may move lengthwise of said extended end 41, but must rotate therewith.

The engagement of the clutch 46 with the drive pulley 42 may be controlled by means of the clutch control mechanism disclosed in detail in my co-pending application for a "Self-tensioning rake reel drive" executed concurrently herewith.

The leading edge 49 of the triangularly shaped horizontal flange 51 of the wheel bracket 35 is secured, as by bolting, to the rightward or trailing end of the rearward main basket support bar 52 (Figure 1). The rake basket 53, which may be of a conventional type, has, in this embodiment of the invention, rearward and front main basket support bars 52 and 54, which bars extend the full length of the basket 53 and are connected at their extremities by means of the leftward, or leading end, and rightward, or trailing end, transverse bars 55 and 56, respectively. The main basket bars 52 and 54, and the transverse bars 55 and 56 may be fabricated from any suitable structural shapes, such as angles, as shown in the drawings.

Figure 2:
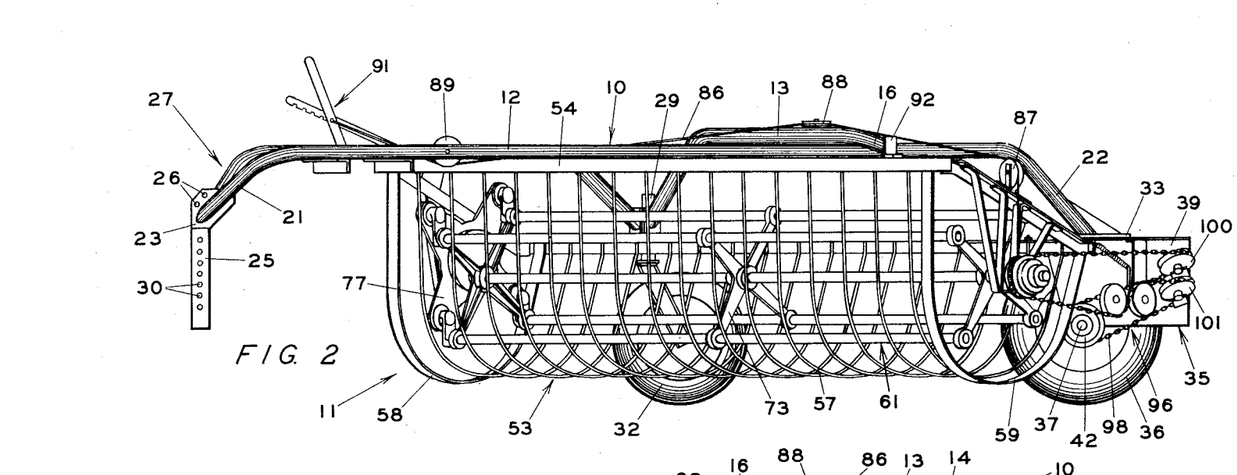
Figure 2 is a side elevation of the said rake and supporting frame.
Figure 3:
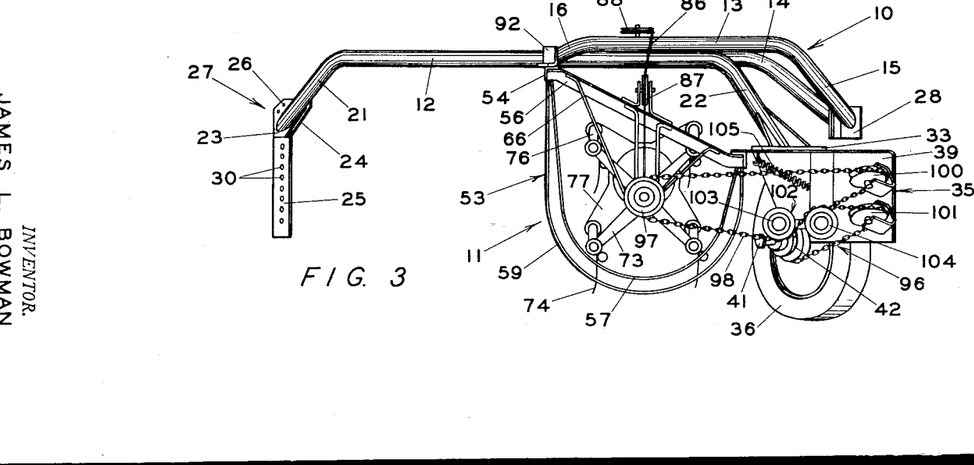
Figure 3 is an oblique side elevation view of the rake and frame.
Figure 4:
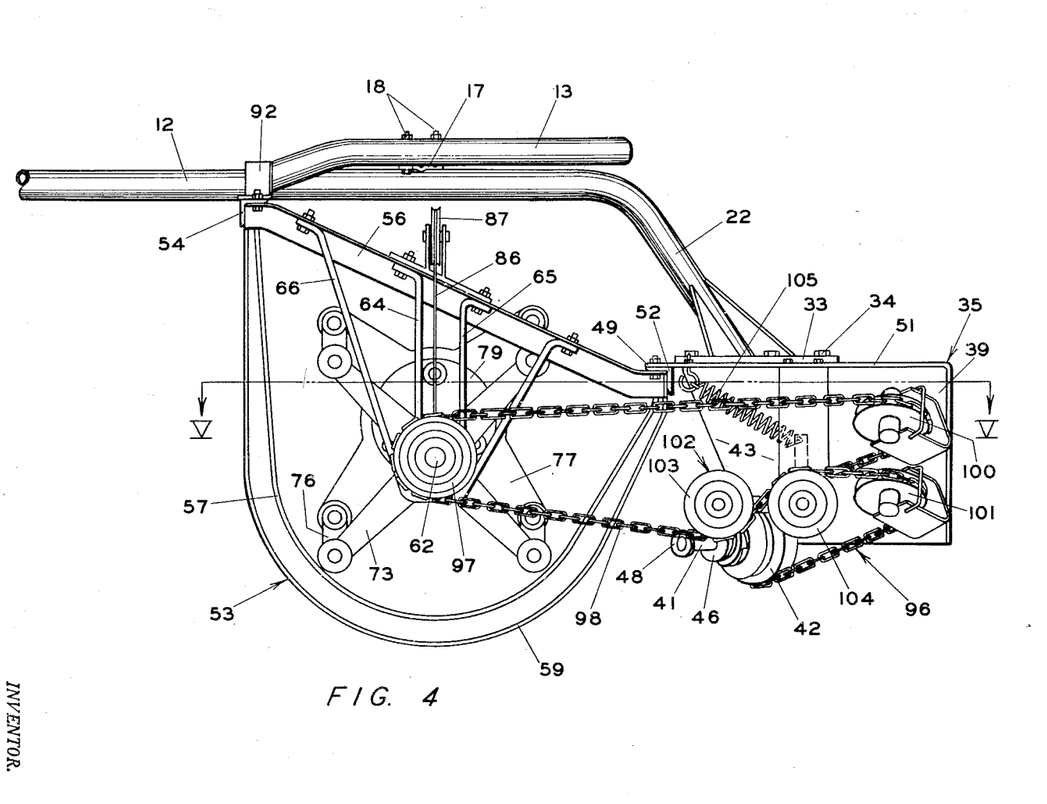
Figure 4 is an end elevation view of the rake reel and basket including the reel drive mechanism but omitting the drive wheel and the clutch operating mechanism.

As shown in Figures 1, 2 and 4, a plurality of substantially U-shaped basket rods 57 depend between and are rigidly secured to the main basket bars 52 and 54, preferably at regularly spaced intervals. The guard runners 58 and 59, one of which is positioned at each end of the said basket 53, are also substantially U-shaped, and are secured to and depend between the main basket bars 52 and 54. The guard runners 58 and 59 which are much stronger than the basket rods 57, extend below said basket rods to protect them from excessive contact with the ground.

Figure 7:
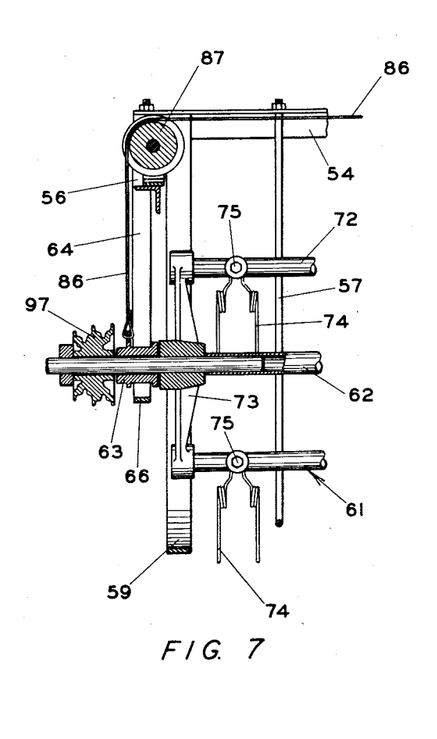
Figure 7 is a sectional view of Figure 6 taken along the line VII—VII.

A rake reel 61, which is cradled within the U-shaped basket rods 57 of the rake basket 53, has a reel shaft 62 which extends beyond the full length of said rake basket. The rightward end of the shaft 62 is rotatably supported within a bearing block 63 (Figures 5 and 7), which block is vertically slidably retained between the substantially vertical bearing block guides 64 and 65. These vertical guides 64 and 65 are secured at their upper ends, as by bolting, to the rightward transverse bar 56. The lower ends of said vertical guides are secured, as by welding, to a bearing block support strap 66 whose ends are secured, as by bolting, to said rightward transverse bar 56.

Figure 8:
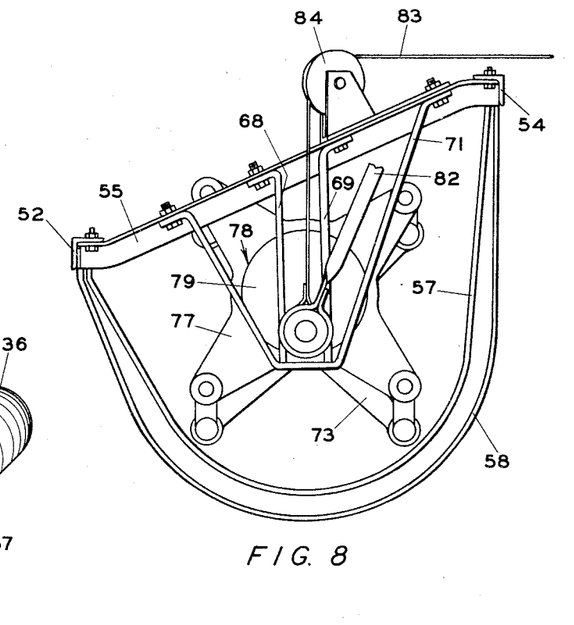
Figure 8 is an end view of the reel and basket opposite from the end shown in Figure 4.
Figure 10:
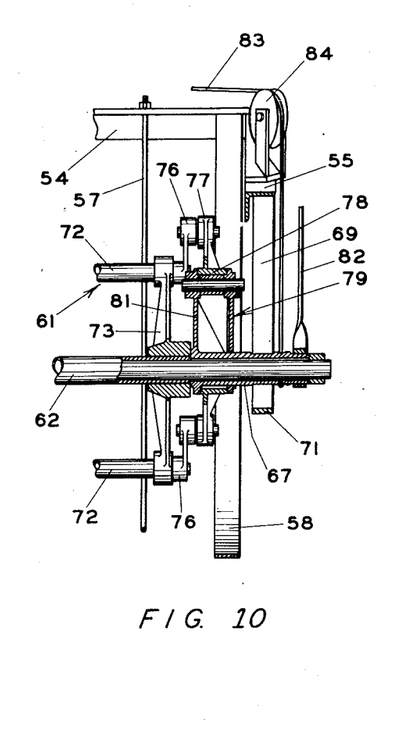
Figure 10 is a sectional view of Figure 9 taken along the line X—X.

The leftward end of the reel shaft 62 is rotatably supported within a bearing housing 67 (Figures 8 and 10), which housing is vertically slidably retained between the substantially vertical bearing housing guides 68 and 69. These vertical guides 68 and 69 are secured at their upper ends, as by bolting, to the leftward transverse bar 55. The lower ends of said vertical guides are secured, as by welding, to a bearing housing support strap 71 whose ends are secured, as by bolting, to said leftward transverse bar 55.

The rake reel 61, which may be of a conventional type, has four tine supporting tubes 72 which are rotatably supported, parallel to the reel shaft 62 and equidistant from each other, by the arms of three spiders 73. The spiders 73 are rotatable with and secured to the rake reel shaft 62, one near each end thereof and one about midway between the ends of the shaft, as shown in Figures 1 and 2.

Figure 5:
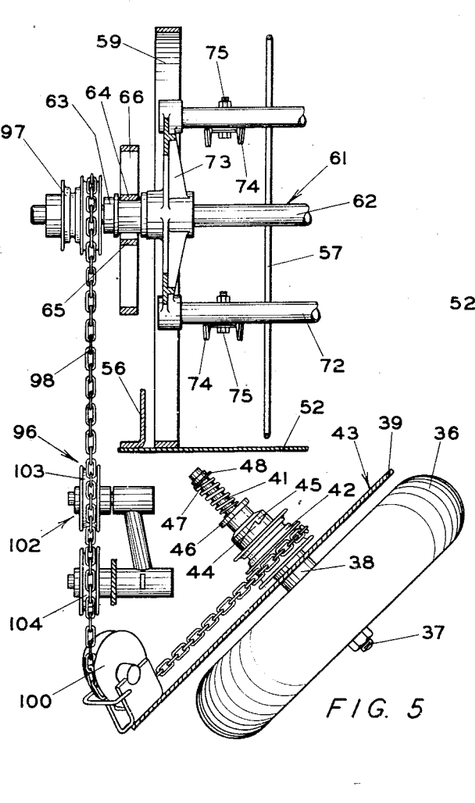
Figure 5 is a sectional view of Figure 4 taken along the line V—V.
Figure 6:
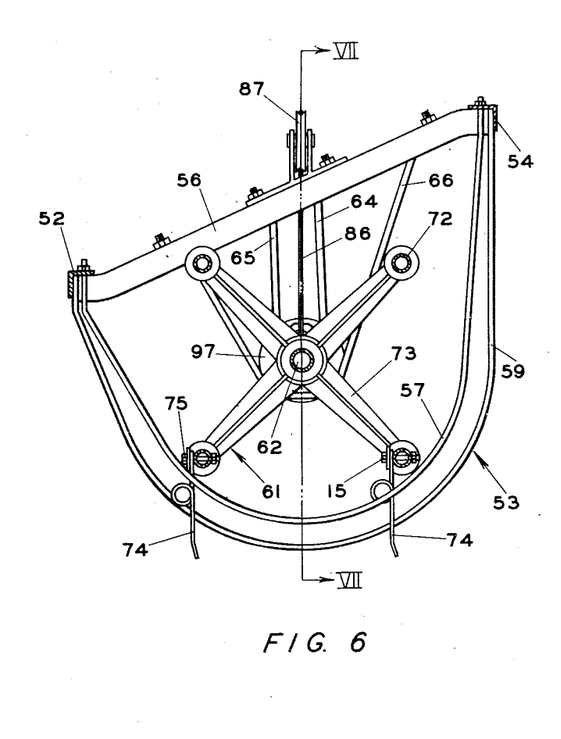
Figure 6 is a sectional view of Figure 1 taken along the line VI—VI.
Figure 9:
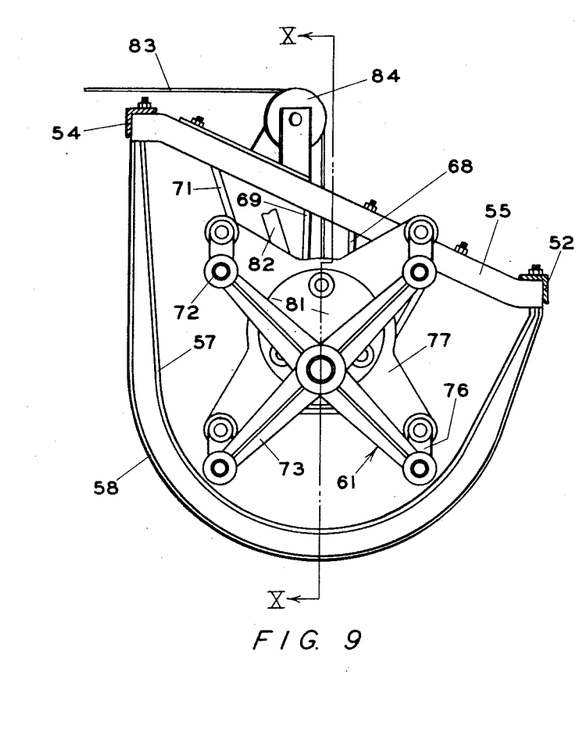
Figure 9 is a sectional view of Figure 1 taken along the line IX—IX.

The rake tines 74, which may be of any convenient, resilient type, such as shown in Figures 5, 6 and 9, are secured, as by means of the bolts 75, to the tine supporting tubes 72. Said tines 74 are positioned along said tubes 72 so that they may extend beyond and between the U-shaped basket rods 57, in the usual manner when and as required.

The leftward ends of the tine tubes 72 are each engaged by and secured to a crank 76 (Figures 8, 9 and 10), which cranks are in turn rotatably supported upon the arms of a control spider 77. The spider 77 has a large concentric hub 78, which is rotatably supported upon an eccentric control drum 79 so that said control spider 77 and its hub 78 are eccentrically disposed with respect to the reel shaft 62. The control drum 79, which is rotatably and eccentrically supported upon the reel shaft 62, is held adjustably fixed with respect to the rake basket 53. The inner plate 81 of said control drum 79 is secured to, and preferably is an integral part of, the inner end of the bearing housing 67. The outer end of the bearing housing 67 is fixedly engaged by a suitable lever arm 82. The lever arm 82 is advantageously actuated by means of appropriate linkage, not shown, which linkage extends from the free end of said lever arm to a convenient position at the hitching corner 27 of the supporting frame 10.

The leftward end of the rake reel 61 is held at a desired vertical position between the bearing housing guides 68 and 69 by means of a reel elevation cable 83 (Figure 8), which is secured to the bearing housing 67 between the lever arm 82 and said vertical bearing housing guides 68 and 69. The cable 83 extends upwardly over a conventional pulley 84, which pulley is supported by a suitable bracket upon the leftward transverse bar 55. Said cable passes from the pulley 84 to a suitable control mechanism 85 (Figure 1) mounted at the frame hitching corner 27.

The rightward end of the rake reel 61 is held at a desired vertical position between the vertical bearing block guides 64 and 65 by means of a reel elevation cable 86 which is secured to the bearing block 63. The cable 86 passes up over a pulley 87, around a pulley 88 and under a pulley 89, and is secured to a suitable control mechanism 91 mounted at the frame hitching corner 27. The pulleys 87, 88 and 89 are rotatably supported upon the rightward transverse bar 56, the lateral support beam 13 and the longitudinal support beam 12, respectively. Thus, the elevation of the rake reel 61 can be controlled from the hitching corner 27 of the rake supporting frame 10.

The rightward end 16 of the lateral beam 13 is secured, as by welding, to a bracket 92, which bracket is bolted or otherwise attached to the rightward end of the front main basket support bar 54. Thus, the rightward or trailing end of the rake basket 53 is suspended from the lateral beam rightward end 16 and from the longitudinal beam trailing end 22.

The leftward or leading end of the rake basket 53 is suspended from the connecting support beam 14 by means of a hanger 93, which is secured to the rearward basket support bar 52, and by means of a bolt 94 which is secured to the front basket support bar 54. The front support bar 54 is also secured, approximately midway between its extremities, to the longitudinal support beam 12 by means of a bolt 95.

The rake reel 61, hence the rake basket 53, is so positioned that its longitudinal axis is at an angle approximately forty-five degrees with the axis of the drive wheel 36. Thus, the rake basket 53 is at an angle of about forty-five degrees to the normal direction of movement of the wheeled rake supporting frame 10. It will be understood, however, that this particular angular relationship between the rake reel and drive wheel is of an arbitrary nature and may be varied as desired or required. Furthermore, the exact location of the position of overlap between the longitudinal and lateral support beams 12 and 13, respectively, may be varied along said beams, intermediate their extremities without departing from the scope of the invention. This allows for a variation in the size of the particular rake basket and reel to which the wheeled supporting frame is to be adapted, and provides for adaptation of said frame to the desired angular relationship between the axis of the reel and the axis of the drive wheel.

The intersection of said longitudinal and lateral supporting beams is preferably arranged so that the drive wheel 36 is as near as possible to being aligned with the pulling force while safely avoiding a condition in which the rightward side of the basket 53 would be permitted to drop on the ground. One successful arrangement has been found to exist when the drive wheel 36 is positioned sufficiently inboard of the rightward end of the rake basket to place approximately four times as much of the weight of the entire machine on the drive wheel as is supported by the pivot wheel 32 but still being definitely to the rightward of the center of gravity of the whole machine. Although other satisfactory arrangements are possible, it has been found that under this relationship between said drive wheel 36 and pivot wheel 32 there is no tendency for the rake to tip under the most vigorous conditions of operation, and yet the drive wheel is sufficiently in line with the line of traction force applied to the rake that the drag imposed upon the drive wheel 36 by the rake reel 61 through the drive mechanism 96 effects no appreciable yaw in the movement of the rake 11.

As shown in Figures 4 and 5 and as disclosed in detail in my above mentioned co-pending application, the drive mechanism 96 is comprised of a reel pulley 97 and a drive pulley 42 interconnected by means of a chain 98. The upper and lower direction changing pulleys 100 and 101, respectively, over which said chain 98 passes between said reel and drive pulleys, are rotatably secured to the vertical flange inside surface 43 of the drive wheel support bracket 35.

An automatic chain tensioning device 102, which includes a fixed pulley 104 and a movable pulley 103, engages the chain 98 between the reel pulley 97 and the lower direction changing pulley 101. A tensioning spring 105, which tends to urge the movable pulley 103 downwardly (Figure 4) holds the chain 98 under constant tension.

The aforementioned drive mechanism 96 and the tensioning device 102 represent but one preferred means for driving the rake reel 61, which means is made possible with my improved type of wheeled rake supporting frame 10.

Operation

The rake supporting frame 10 is secured to the rear end of a suitable traction device, such as any common farm tractor, by means of the hitching bar 25 (Figures 1 and 2). The plurality of openings 30 in the bar 25 allow for level adjustment of the rake supporting frame 10.

The rake reel 61 is adjusted to the desired level by means of the control mechanisms 85 and 91 which are connected by means of the reel elevation cables 83 and 86, respectively, to opposite ends of the rake reel shaft 62. The tensioning device 102 allows for or takes up the slack in the chain 98 during the lowering or raising of the rake reel 61.

The rake tines 74, which are bolted to and rotatable with the tine supporting tubes 72, are adjusted to the desired pitch by means of the lever arm 82. Movement of said lever arm 82, which is fixed with respect to the eccentric control drum 79, effects a change in the position of the control spider 77, thereby causing a change in the attitudes of the cranks 76. Since the said cranks 76 are secured to the leftward ends of the tine supporting tubes 72, said tubes are caused to rotate and change the pitch of the tines 74.

Inasmuch as the operation of the type of rake reel and eccentric pitch control herein disclosed is well known to the art, details relating thereto are omitted.

The clutch 46 is caused to engage the drive pulley 42 and the side delivery rake 11 is ready for operation. The rotational planes of the pivot wheel 32 and the drive wheel 36 are close enough together to greatly reduce the frequency and force of contact between the rake basket and the ground under most conditions of even irregular terrain. The said wheels are in trail of the swath of the rake reel 61, and hence do not crush or compact the crops to be raked. The reel is driven at the rightward end where the maximum load is imposed thereon, and hence the torque imposed throughout the length of the shaft is much reduced.

Advantages and objectives described above, as well as others not specifically mentioned, will be seen to be accomplished by the rake as herein disclosed.

Various modifications may be made in the specific structure described, therefore the specific embodiment herein utilized for illustrative purposes should be clearly understood as selected by way of example only. Many modifications are entirely feasible within the scope of the invention and the hereinafter appended claims should be considered as readily applicable thereto excepting where by their own express terms they are otherwise limited.

I claim:

1. In a wheeled supporting frame for a side delivery agricultural rake having a rake reel and a rake basket suspended from said supporting frame, the combination comprising: three support beams secured to each other in a trinagular arrangement providing a first corner, a second corner and a third corner, the two beams forming said third corner extending beyond their point of mutual intersection; a pivot wheel adjacent to and supporting said second corner; a hitching means provided at said first corner for securing said wheeled frame to traction applying means; one end of the said rake basket being secured to and suspended from the support beam opposite said third corner and the other end of said rake basket being secured to and suspended from the extended ends of said two beams which extend beyond said third corner; a driving wheel secured to and supporting said extended end of that support beam opposite the said second corner and in the trail of said rake reel and said rake basket, the rotational plane of said driving wheel intersecting the longitudinal axis of said rake reel at an angle of approximately forty five degrees; a chain drive whereby said driving wheel drivingly engages said rake reel at said other end whereby to drive it at its end of maximum load; and a reel position control mechanism controlling the spacing of said reel from the ground; said driving wheel being sufficiently inboard of the said other end of said rake basket to place approximately four fifths of the total weight of said rake on said driving wheel and said wheels being so positioned that their respective planes of rotation pass on each side of said first corner.

2. In a wheeled supporting frame for a side delivery agricultural rake having a rake reel and a rake basket suspended from said supporting frame, the combination comprising: three support beams secured to each other in a triangular arrangement providing a first corner, a second corner and a third corner, the two beams forming said third corner extending beyond their point of mutual intersection; a pivot wheel supporting said second corner; a hitching means provided at said first corner for securing said wheeled frame to a traction device; one end of the said rake basket being secured to the support beam opposite said third corner and the other end of said rake basket being secured to and suspended from the extended ends of said two beams which extend beyond said third corner; a driving wheel supporting said extended ends of said beams which extend beyond said third corner; and means whereby said driving wheel drivingly engages said rake reel at the adjacent end thereof; all arranged and constructed so that the said rake basket is secured to and suspended from the said three support beams and so that the said pivot wheel and said driving wheel are in trail of the said rake basket.

3. In a wheeled supporting frame for a side delivery agricultural rake having a rake reel and a rake basket suspended from said supporting frame, the combination comprising: three support beams secured to each other in a triangular arrangement providing a first corner, a second corner and a third corner, the two beams forming said third corner extending beyond their point of mutual intersection; a pivot wheel supporting said second corner; a hitching means provided at said first corner for securing said wheeled frame to a traction device; one end of the said rake basket being secured to the support beam opposite said third corner and the other end of said rake basket being secured to and suspended from the extended ends of said two beams which extend beyond said third corner; a driving wheel supporting said extended ends of said beams which extend beyond said third corner; and means whereby said driving wheel rotatably engages said rake reel at an end thereof; all arranged and constructed so that the said pivot wheel and said driving wheel are in trail of the said rake basket.

4. In a wheeled supporting frame for a side delivery agricultural rake having a rake reel and a rake basket suspended from said supporting frame, the combination comprising: three support beams secured to each other in a triangular arrangement providing a first corner, a second corner and a third corner, the two beams forming said third corner extending beyond their point of mutual intersection; a pivot wheel supporting said second corner; a hitching means provided at said first corner for securing said wheeled frame to traction means; one end of the said rake basket being secured to the support beam opposite said third corner and the other end of said rake basket being secured to an suspended from the extended ends of said two beams which extend beyond said third corner; a driving wheel supporting said extended ends of said beams which extend beyond said third corner; and means whereby said driving wheel rotatably engages and drives said rake reel; said driving wheel being in the trail of the rake basket and aligned substantially parallel to the center line of the traction applied to said rake.

5. In a triangularly shaped supporting frame for a side delivery agricultural rake having a rake reel and a rake basket suspended from said frame, the combination comprising: a triangularly shaped frame having first, second and third corners; hitching means provided at a first corner of said triangularly shaped frame for securing said frame to traction means; a pivot wheel supporting a second corner of said triangularly shaped frame; a driving wheel supporting a third corner of said triangularly shaped frame; means supporting said rake reel and rake basket upon said frame with one end substantially inboard of and close to said pivot wheel and the other end extending materially outboard of said driving wheel, whereby to place the greater portion of the weight thereof upon said driving wheel; and driving means whereby said driving wheel rotates said rake reel; said pivot wheel and said driving wheel being in trail of the said rake basket and on opposite sides of the extended center line of the traction applied to said rake.

6. In a wheeled supporting frame for a side delivery rake having a rake reel and rake basket, the combination comprising: a triangular frame having a first corner, adapted for hitching to traction means, in forwardmost position, a second corner positioned at one side of said first corner and following same and a third corner positioned at the other side of said first corner and following both of said first and second corners; a pivot wheel supporting said second corner; a driving wheel supporting said third corner; means supporting said rake reel and rake basket upon said frame, one end of said rake reel and rake basket being supported ahead of and closely adjacent said pivot wheel and substantially inboard thereof and the other end of said rake reel and rake basket being supported a head, adjacent and substantially outboard of said driving wheel, whereby to place most of the load of said rake reel and rake basket upon said driving wheel; and means drivingly connecting said driving wheel to said rake reel.

7. In a wheeled supporting frame for a side delivery agricultural rake having a rake reel and a rake basket suspended from said supporting frame, the combination comprising: three support beams secured to each other in a triangular arrangement providing a first corner, a second corner, and a third corner, the two beams forming said third corner extending beyond their point of mutual intersection; a pivot wheel adjacent to and supporting said second corner; a hitching means provided at said first corner for securing said wheeled frame to traction applying means; one end of the said rake basket being secured to the support beam opposite said third corner and the other end of said rake basket being secured to and suspended from the extended ends of said two beams which extend beyond said third corner; a driving wheel secured to and supporting said extended end of that support beam opposite the side second corner and in the trail of said rake reel and rake basket, the rotational plane of said driving wheel intersecting the longitudinal axis of said rake reel at an angle of approximately forty five degrees; drive means drivingly connecting said driving wheel to said rake reel at said other end, whereby to drive it at its end of maximum load; said driving wheel being sufficiently inboard of the said other end of said rake basket to place more than one half of the total weight of said rake on said driving wheel and said wheels being so positioned that their respective planes of rotation pass on each side of said first corner.

JAMES L. BOWMAN.

REFERENCES CITED

The following references are of record in the file of this patent:

UNITED STATES PATENTS

| Number | Name | Date |
|---|---|---|
| 1,283,474 | Dain | Nov. 5, 1918 |
| 2,403,401 | Rietz | July 2, 1946 |